July 11, 1933.  C. M. SPEAR  1,917,999
BRAKE
Filed Sept. 27, 1929
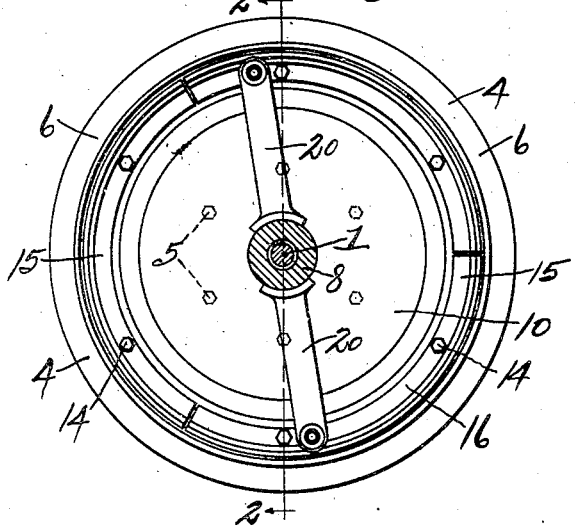
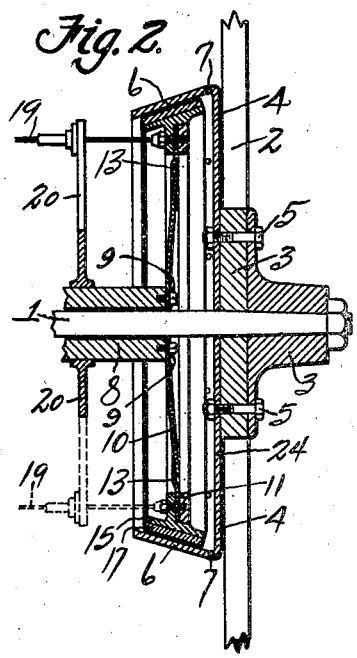
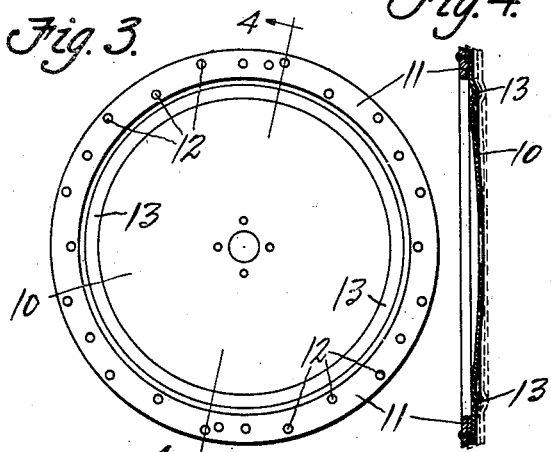
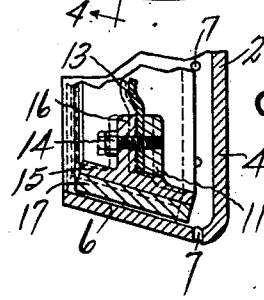
INVENTOR.
Charles M. Spear.
BY
ATTORNEY.

Patented July 11, 1933

1,917,999

UNITED STATES PATENT OFFICE

CHARLES M. SPEAR, OF NEW CARLISLE, INDIANA

BRAKE

Application filed September 27, 1929. Serial No. 395,681.

The invention relates to brakes, and more particularly to automobile brakes and the like, and has for its object to provide a device of this character in which a conical brake drum and brake shoe are employed, said brake shoe being carried by a spring disc in spaced relation to said drum and being adapted for lateral or axial movement to bearing contact with the drum against the action of said spring.

A further object is to provide a device of this character in which a conical brake drum and brake shoe are provided, said brake shoe being adapted for axial movement to uniform bearing or braking contact with the small diameter portion of said drum.

A further object is to provide a device of this character having a conical brake drum, and a conical brake shoe mounted in spaced relation therein on a spring disc, said spring disc comprising a segment of a sphere of spring metal having a concentric annular corrugation therein adjacent its outer periphery, said spring being adapted to be flexed to permit axial movement of the periphery thereof.

A further object is to provide a device of this character employing a conical brake drum and brake shoe, in which the brake shoe is constructed of a plurality of sections to permit assembly and disassembly thereof within the brake shoe.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a plan view of the brake.

Figure 2 is a sectional view of the brake taken on line 2—2 of Figure 1.

Figure 3 is a plan view of the spring disc.

Figure 4 is a sectional view of the spring disc taken on line 4—4 of Figure 3, showing in dotted lines the manner in which the disc is adapted to be flexed.

Figure 5 is a plan view of a sector of the brake shoe.

Figure 6 is a fragmentary sectional view of the brake shoe showing the manner in which the operating cable is secured to the brake shoe.

Figure 7 is a fragmentary sectional view of the brake showing the brake shoe in braking or bearing contact with the brake drum in dotted lines.

Referring to the drawing, which illustrates the preferred embodiment of the invention, the numeral 1 designates an automobile axle on which is mounted an automobile wheel 2 having a hub 3. On the inner side of the wheel 2 is secured a brake drum 4 by means of bolts 5 extending through said brake drum and said wheel hub, the braking portion 6 of said drum being of conical shape and tapering to a relatively small diameter periphery. A plurality of small spaced holes 7 extend through said brake drum at the largest diameter thereof to form draining means for the water and dirt which may be caught therein. The axle 1 is mounted in an axle housing 8 which extends within the drum to a point spaced from the back plate 24 of said drum a distance substantially one-half the width of said brake drum. Secured to the outer end of the axle housing 8 by means of the screws 9 is a disc 10 formed of spring metal, said spring disc having the approximate shape of a segment of a sphere with its periphery extending outwardly with relation to the central portion thereof secured to the axle housing. A reinforcing ring 11 is secured to the outer side of the disc 10 adjacent its outer periphery by means of the rivets 12, the outer periphery of said ring being preferably tapered; and at a point just within the ring 11 a concentric annular corrugation 13, whose crown portion extends inwardly in the same direction as the crown portion of the disc, is formed in the disc, the purpose of said corrugation being hereinafter set forth. Mounted on the outer periphery of the disc 10 by means of the bolts 14 are the brake shoe members 15, of which three or more form the brake shoe, as shown in Figures 1 and 5, said brake shoe members having integrally formed inwardly extending flanges 16 through which the bolts 14 extend to secure the brake shoe members to the disc 10. The brake shoe 15 carries the brake lining 17, and said brake shoe and brake lining are both of conical shape and are normally held in spaced relation to said drum, but are of a size and shape to bear against the brake drum at the small diameter portion thereof with a complete bearing contact. Secured to the brake shoe flange 16 and the disc 10 at points diametrically opposite each other are bolts 18, to the head of which bolts are secured cables 19, said cables being guided by the arms 20 welded or otherwise suitably secured to the axle housing 8, the inner ends of the cables 19 being secured to equalizers (not shown) which are suitably connected with the brake actuating means (not shown).

The brake is operated by an inward pull on the cables 19 to uniformly and bodily move the brake shoe laterally axially into complete bearing contact with the small diameter portion of the brake drum against the action of the spring disc 10 which forms the sole supporting means for the brake shoe. The spring disc 10 is adapted to release the brake shoe upon release of pressure from the cables 19, and is constructed similarly to, and operates in the same manner as, the disc bottom of an oil cup, which is depressed or flexed to effect a discharge of oil therefrom and which returns to normal position upon release of pressure therefrom. The concentric corrugation 13 in the disc permits the flexing of the disc to perform its function, as shown in Figure 4, by changing its shape to accommodate the change of shape of the flexed portion of the disc. The degree of bend of the disc itself is preferably as slight as necessary to perform its function, but must be sufficient to permit the spring to function to withdraw the brake shoe from the drum upon release of the brake actuating means. The ring 11 carried by the back of the spring disc, and the flanges 16 of the brake shoe members form a solid marginal rim for the spring disc, so that a pull by the cables 19 will be equally applied to all portions of the periphery of the brake drum. To prevent locking of the brake after it has been applied, the degree of taper of the brake drum and brake shoe must be as large as practicable, an angle of approximately 15 degrees being generally sufficient for this purpose, although greater angles are desirable if the practical construction of the brake permits their use. The spring disc 10 and the reinforcing ring carried thereby must obviously be of a diameter slightly smaller than the diameter of the small open end of the brake drum to permit the insertion thereof within the brake shoe. The brake shoe is formed in three or more parts to permit assembly and disassembly of the brake shoe in the brake drum through the relatively small diameter open end thereof, the tapering outer periphery of the disc reinforcing ring 11 permitting the brake shoe to be slipped on and off of the disc by a movement substantially parallel to the taper of the brake drum. The bolts 5 which secure the brake drum 4 to the automobile wheel 2 permit easy removal of the wheel from the axle when necessary without disassembling the brake, the brake drum being supported by the brake shoe when said wheel is removed.

Obviously details of construction of the brake may be varied from those which I have set out, such as the particular construction of the spring disc, the brake shoe, the brake actuating means, and the like; but the principle of the invention resides in the provision of the conical brake drum and the conical brake shoe mounted on the spring disc therein in a manner to permit lateral axial movement of the brake shoe into and out of bearing contact with the small diameter portion of the brake drum against and under the influence of the spring disc, respectively; and in the provision of a brake shoe so constructed as to permit its assembly and disassembly in the brake drum.

The invention having been set forth, what is claimed as new and useful is:

1. In a brake, a conical brake drum, a rigid multi-sectional conical brake shoe disposed in said drum in spaced relation thereto, said brake shoe being adapted for assembly and disassembly through the small diameter end of said drum, a spring disc mounted fixedly in spaced relation to said drum at its center and mounting said shoe, said spring disc having a central bulge in the direction of the taper of said drum and a concentric annular corrugation adapted to accommodate axial flexing of said disc forming a margin for said bulge, a rigid reinforcing ring secured to the outer side of said disc at the periphery thereof, and means adapted to axially flex said spring disc to bring said brake shoe into bearing contact with the small diameter portion of said brake drum.

2. In a brake, a conical brake drum, a rigid conical brake shoe disposed in said brake drum in spaced relation thereto, a spring disc mounted fixedly in spaced relation to said drum at its center and supporting said brake shoe, said spring disc comprising a spherical segment whose periphery normally extends outwardly toward the large diameter end of said drum and which is provided with a concentric annular corrugation adjacent its periphery adapted to accomodate axial flexing of said disc, and means for flexing said spring disc to axially move said shoe into bearing contact with said drum.

3. In a brake, a conical brake drum, a rigid conical brake shoe disposed in said brake drum in spaced relation thereto, a spring disc mounted fixedly relative to said drum at its center and supporting said brake shoe, and means for flexing said disc to axially move the brake shoe into bearing contact with the small diameter end of said brake drum, said spring disc comprising a spherical segment having its periphery normally directed toward the large diameter end of said drum.

4. In a brake, a conical brake drum, a rigid conical brake shoe disposed in said brake drum in spaced relation thereto, a spring disc mounted fixedly relative to said drum at its center and supporting said brake shoe, and means for flexing said disc to axially move said brake shoe into bearing contact with said brake drum, said spring disc having a central bulge in the direction of the taper of said drum and shoe and having a concentric annular corrugation therein forming a margin for said bulge and adapted to accommodate axial flexing of said disc.

5. In a brake, a conical brake drum, a rigid conical brake shoe disposed in said brake drum in spaced relation thereto, a spring disc mounting said brake shoe, said disc being fixedly mounted relative to said drum at its center, a rigid reinforcing ring secured to said disc at the outer edge thereof, and means for flexing said spring disc to axially move the brake shoe into bearing contact with the small diameter portion of said drum.

6. In a brake, a conical brake drum having a back from which its bearing surface tapers, a spring disc disposed in and fixedly mounted at its center relative to said drum, a multi-section rigid conical brake shoe secured to said spring disc in spaced relation to the bearing surface of said drum, and means adapted to flex said spring disc to axially move said brake shoe into bearing contact with said drum.

7. In a brake, a conical brake drum, a rigid conical brake shoe disposed in said drum in spaced relation thereto, a spring disc supporting said brake shoe and fixedly mounted relative to said drum at its center, said spring disc having a concentric annular corrugation adjacent its periphery adapted to accommodate axial flexing thereof, and means adapted to flex said spring disc to axially move said shoe into bearing contact with said drum.

8. In a brake, a conical brake drum, a rigid conical brake shoe disposed in said drum, a spring disc supporting said shoe in spaced relation to said drum and fixedly mounted relative to said drum at its center, and means for axially flexing said disc to bring said shoe into bearing contact with said drum.

In testimony whereof I affix my signature.

CHARLES M. SPEAR.